United States Patent
Veerubhotla et al.

(10) Patent No.: US 9,805,350 B2
(45) Date of Patent: Oct. 31, 2017

(54) SYSTEM AND METHOD FOR PROVIDING ACCESS OF DIGITAL CONTENTS TO OFFLINE DRM USERS

(71) Applicant: Infosys Limited, Bangalore (IN)

(72) Inventors: Ravi Sankar Veerubhotla, Hyderabad (IN); Ashutosh Saxena, Hyderabad (IN); Shikha Gupta, New Delhi (IN); Harigopal K. B. Ponnapalli, Hyderabad (IN)

(73) Assignee: Infosys Limited, Bangalore (IN)

( * ) Notice: Subject to any disclaimer, the term of this patent is extended or adjusted under 35 U.S.C. 154(b) by 993 days.

(21) Appl. No.: 13/941,315

(22) Filed: Jul. 12, 2013

(65) Prior Publication Data

US 2014/0047558 A1    Feb. 13, 2014

(30) Foreign Application Priority Data

Jul. 16, 2012    (IN) ............................ 2864/CHE/2012

(51) Int. Cl.
     *G06F 21/10*      (2013.01)
     *G06Q 20/12*      (2012.01)
     *H04L 29/06*      (2006.01)

(52) U.S. Cl.
CPC ......... *G06Q 20/1235* (2013.01); *G06F 21/10* (2013.01); *G06F 21/105* (2013.01); *H04L 63/0428* (2013.01); *H04L 63/102* (2013.01); *H04L 2463/101* (2013.01)

(58) Field of Classification Search
None
See application file for complete search history.

(56) References Cited

U.S. PATENT DOCUMENTS

| 7,571,143 | B2 * | 8/2009 | Circenis | G06Q 30/04 705/400 |
| 2005/0227773 | A1 * | 10/2005 | Lu | H04N 21/47202 472/60 |

(Continued)

OTHER PUBLICATIONS

Schmidt et al., "Interoperability Challenges for DRM Systems," Virtual Goods 2004, International Workshop for Technology, Economy, Social and Legal Aspects of Virtual Goods, May 27-29, 2004, Ilmenau, Germany, 12 pages.

*Primary Examiner* — Mamon Obeid
*Assistant Examiner* — El Mehdi Oussir
(74) *Attorney, Agent, or Firm* — Klarquist Sparkman, LLP

(57) ABSTRACT

The invention relates to a system and method providing access of one or more heterogeneous digital contents to at least one offline Digital Rights Management (DRM) user by a DRM server. This invention involves establishing the trust relationship among the DRM server, DRM client, user's machine and the end user by means of digital certificate. The server generates protected digital content by means of using a standard encryption algorithm. The invention further involves determining whether a license for accessing the protected file is requested by the legitimate user, and if so, generating a license consisting the user rights and the protected decryption key to be downloaded by legitimate user. The DRM client decrypts the protected file using a decryption key of the license, and renders the content to the end user by calling the appropriate and customized viewer during consumption.

33 Claims, 11 Drawing Sheets

(56) References Cited

U.S. PATENT DOCUMENTS

| | | | |
|---|---|---|---|
| 2006/0021068 A1* | 1/2006 | Xu | G06F 21/10 726/30 |
| 2006/0089912 A1* | 4/2006 | Spagna | G06F 21/10 705/51 |
| 2008/0034231 A1* | 2/2008 | Ginter | G06F 21/10 713/194 |
| 2008/0168568 A1* | 7/2008 | Brodersen | G06F 21/10 726/30 |
| 2008/0240447 A1* | 10/2008 | Zhu | H04L 63/0853 380/279 |
| 2009/0183001 A1* | 7/2009 | Lu | G06F 21/10 713/168 |
| 2009/0282245 A1* | 11/2009 | Farrugia | G06F 21/10 713/168 |
| 2014/0047557 A1* | 2/2014 | Veerubhotla | G06F 21/10 726/28 |

\* cited by examiner

SYSTEM AND METHOD FOR PROVIDING ACCESS OF DIGITAL CONTENTS TO OFFLINE DRM USERS

FIELD OF THE INVENTION

The present invention relates generally to provide access for protected digital contents to Digital Rights Management (DRM) users, and in particular, to a system and method for providing access of digital contents to offline DRM users.

BACKGROUND

Digital Rights Management (DRM) is a term for access control technologies that can be used by copyright holders, publishers and hardware manufacturers to limit the usage of digital contents and devices. The digital contents can be in the form of documents, e-books, audio, video and game, software libraries. DRM controls the access of sensitive contents by including information about the user rights (i.e. permissions, constraints and obligations) associated with that content. The digital rights management also involves cryptographic techniques and access control mechanisms for preventing unauthorized access; and control usage of contents. Such limitations include the number of copies that may be printed, whether the file may be copied, duration of the file may be accessed and whether the content may be edited.

Presently, a range of DRM solutions are available in the market. But, in most of the cases the client has to be online and connected to the server for consumption of the digital contents. There are very few offline data consumption model present in the market. But existing offline DRM solutions do not provide a uniform framework for the protection of multiple content types such as digital objects, libraries, executables etc. Their relevance and usage is restricted to a particular type of content or a selective range of content types.

In view of the foregoing discussion, there is a need for a DRM solution that can support the offline data consumption by the user, prevent the illegal exploitation of the license and can provide the uniform framework to protect digital objects and software library.

SUMMARY

The present invention overcomes all the above mentioned limitations by providing the facility of offline data consumption if the DRM client has limited or no connectivity to the DRM server. This invention prevents the illegal exploitation of the license by establishing the trust relationship between the server and the end user by a onetime activation or registration and connectivity to the DRM server. Further, this invention provides the uniform framework to protect digital objects and software library.

According to the present embodiment, a method for providing access of one or more heterogeneous digital contents to at least one offline Digital Rights Management (DRM) user by a DRM server is disclosed. The method includes registering the at least one DRM user by generating at least one digital certificate corresponding to the at least one DRM user and a computing device of the at least one DRM user by the DRM server, wherein the at least one digital certificate is sent to the at least one DRM user. Further, the DRM server receives the one or more heterogeneous digital contents from a publisher, wherein the publisher encrypts the one or more heterogeneous digital contents before or after uploading into the DRM server and grants one or more rights to the at least one DRM user with respect to the one or more heterogeneous digital contents after uploading into the DRM server. Further, information related to decryption of the one or more encrypted heterogeneous digital contents, the one or more granted rights, the at least one digital certificate and information related to the at least one user are stored in the repository of the DRM server. After that, when the at least one DRM user wants to render the one or more heterogeneous digital contents, the DRM server authenticates the at least one DRM user based on the information related to the at least one user previously stored in the repository. If the at least one DRM user is authenticated then, the DRM server generates a DRM license, wherein the DRM license includes the information for decrypting the one or more encrypted heterogeneous digital contents and the one or more granted rights for the at least one authenticated DRM user. After generating the DRM license, the DRM server sends the license to the at least one authenticated DRM user to render the digital contents, wherein the one or more heterogeneous digital contents are rendered by using the at least one digital certificate stored at the computing device of the at least one DRM user and the information stored in the DRM license. Alternatively, the DRM user receives the license in an email from the publisher and uses it for rendering the content.

In an additional embodiment, a system for providing access of one or more heterogeneous digital contents to at least one offline Digital Rights Management (DRM) user by a DRM server is disclosed. The system includes a registration module, a publication module, a user rights management module, a repository, an authentication module, a license management module. The registration module is configured to register the at least one DRM user by generating at least one digital certificate corresponding to the at least one DRM user and a computing device of the at least one DRM user by the DRM server. The publication module configured to publish the one or more heterogeneous digital contents in encrypted form at the DRM server by a publisher, wherein the publisher encrypts the one or more heterogeneous digital contents before or after uploading into the DRM server. In accordance with an embodiment of the present disclosure, the publisher uses an encryption module to encrypt the heterogeneous digital contents. The user rights management module configured for granting and revoking one or more rights with respect to the one or more heterogeneous digital contents for the at least one DRM user. The repository is configured for storing information related to the at least one user, information related to decryption of the one or more encrypted heterogeneous digital contents, the user rights information and the at least one digital certificate. The authentication module is configured for authenticating the at least one DRM user who wants to render the one or more heterogeneous digital contents based on information related to the at least one user previously stored in the repository and the license management module is configured for generating and sending a DRM license to the at least one authenticated DRM user to consume the one or more heterogeneous digital contents.

The foregoing and other objects, features, and advantages of the invention will become more apparent from the following detailed description, which proceeds with reference to the accompanying figures.

DRAWINGS

Various embodiments of the invention will, hereinafter, be described in conjunction with the appended drawings provided to illustrate, and not to limit the invention, wherein like designations denote like elements, and in which:

FIG. 1 illustrates an environment in which various embodiments of the invention presented herein may be practiced;

FIG. 2 a block diagram illustrating a system for providing access of one or more heterogeneous digital contents to at least one offline Digital Rights Management (DRM) user by a DRM server, in accordance with an embodiment of the present invention.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a system and method for providing access of one or more heterogeneous digital contents to at least one offline Digital Rights Management (DRM) user by a DRM server. This involves onetime registration of the user and the user's machine. In various embodiments of the present disclosure, the term "user's machine" and the "computing device of the user" will be used synonymously. At least one digital certificate is issued which contains the user certificate and the user's machine certificate. The publisher can upload the digital contents in the DRM server. The publisher encrypts the digital contents and grants rights to the DRM users to access the contents. In various embodiments of the present disclosure, the publisher may be the owner of the digital contents or a distributor of the digital contents or any other person who has the right to upload the content into the DRM server. The DRM server stores the decryption information of the encrypted digital contents, user rights information, digital certificates and the user information in its repository. When the user wants to access the protected digital contents through a DRM client, then the DRM client requests for the license. DRM server generates and sends the DRM license after authenticating the user. The DRM client stores the DRM license locally in the user's machine. The DRM license is digitally signed by the DRM server to protect against tampering. The DRM client verifies the integrity of the DRM license and after that it renders the digital content with the help of the digital certificates stored at the user's machine and also the information stored in the DRM license.

Figure 1:
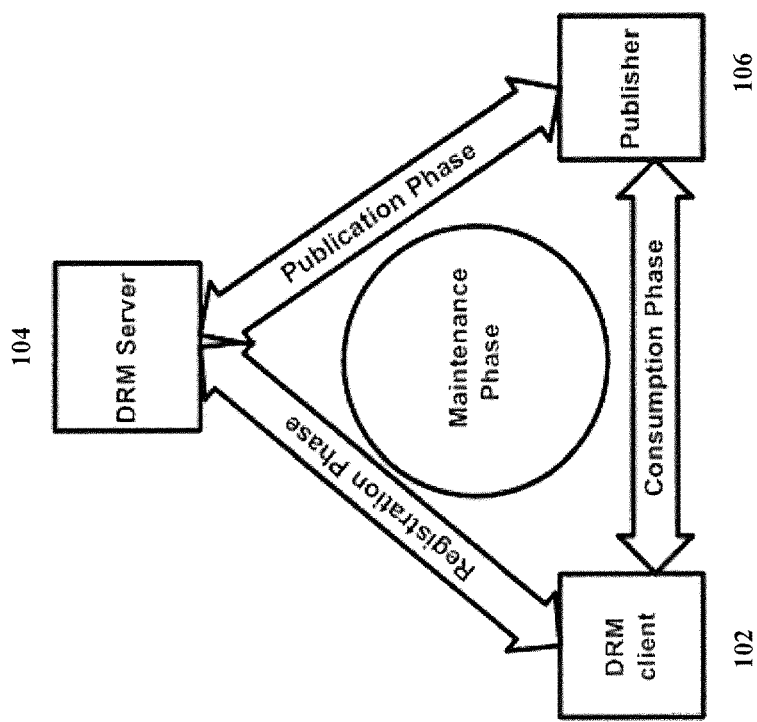

FIG. 1 illustrates an environment in which various embodiments of the invention presented herein may be practiced. This involves DRM client 102, DRM server 104 and the publisher 106. The DRM client is used by the DRM user to communicate with the DRM server. As will be described in detail below this offline model contains four phases. In the registration phase the DRM client 102 registers with the DRM server 104 and DRM server 104 issues a user certificate and a machine certificate. In an alternate embodiment, the machine identification name can be included in the user certificate. In the publication phase, the publisher 106 uploads the digital contents into the DRM server 104. The publisher 106 encrypts the digital contents and grants rights to the DRM users with respect to the access of the digital contents. In the consumption phase, the DRM user receives the DRM license generated at the DRM server 104 and DRM client 102 renders the encrypted digital contents with the help of the user certificate, machine certificate and the DRM license. The maintenance phase is responsible for certificate and key management cycle for offline DRM operation.

Figure 2:
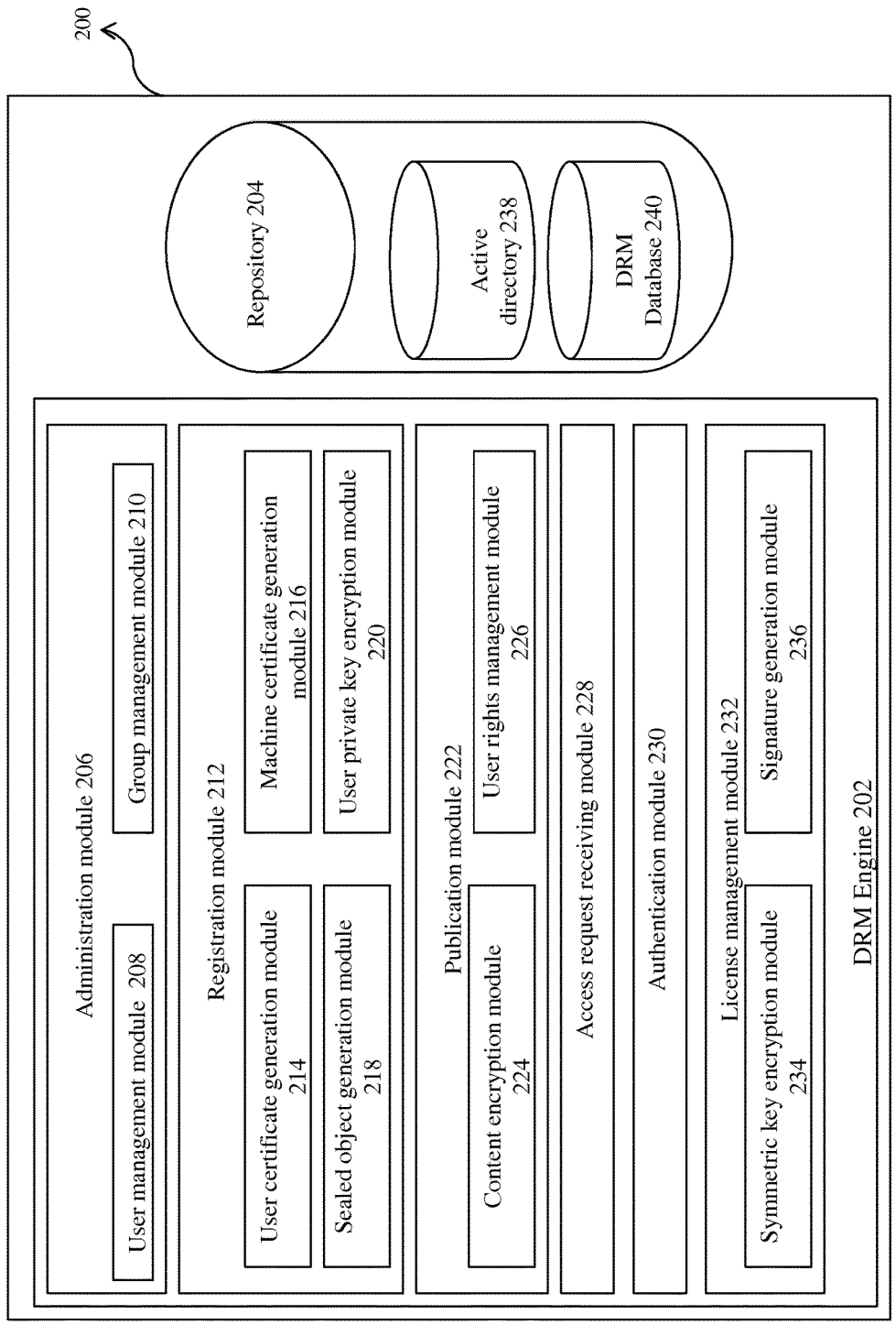

FIG. 2 a block diagram illustrating a system for providing access of one or more heterogeneous digital contents to at least one offline Digital Rights Management (DRM) user by a DRM server. Broadly, the DRM server has two main components; these are a DRM engine 202 and a repository 204. The DRM engine 202 located in the server 200 is responsible for managing the digital content as well as the users. The DRM engine 202 includes an administration module 206, a registration module 212, a publication module 222, a access request receiving module 228, an authentication module 230 and a license management module 232. The administration module 206 further includes user management module 208 and group management module 210. The administrator can manage an individual user through user management module 208 and also can manage a group of individuals through group management module 210. Each member of a group gets the same rights. DRM administrator can add, delete and edit the users in the DRM groups. Users can also be moved from one group to the other. The registration module 212 includes user certificate generation module 214, machine certificate generation module 216, sealed object generation module 218 and user private key encryption module 220. The registration module 212 is configured to register the user and his machine for offline access of the protected digital contents. The user certificate generation module 214 is configured to generate the user certificate which includes user private key and user public key. The machine certificate generation module 216 configured to generate machine certificate for the user's machine which includes machine private key and machine public key. In an alternate embodiment, the machine identification name can be included in the user certificate. The sealed object generation module 218 is configured to generate first and second sealed objects. The machine certificate, root certificate and machine private key are stored in a first sealed object ($S_O$) and saved in the user's machine. The user certificate, root certificate and the user private key are stored in the second sealed object (S') and saved in the user's machine. The second sealed object or the custom password is accessible to the DRM client only. The user private key encryption module 220 is configured to encrypt the user private key either with the machine public key or with a custom password if machine identification name is included in the user certificate. The publication module 222 includes content encryption module 224 and user rights management module 226. The publisher uploads the digital contents in the DRM server and encrypts it with the help of content encryption module 224 by using the encryption function and a random symmetric key. The digital contents may include but are not limited to texts, images, audio, video, mobile applications, games, software libraries and combination thereof. In an alternative embodiment, the publisher can encrypt the digital contents before uploading into the DRM server. Apart from the encryption algorithms, the digital contents can be protected by using encoding techniques and/or watermarking. After encrypting the contents the publisher grants one or more rights to the end users for accessing the digital contents by using the user rights management module 226. One publisher cannot grant rights on the contents published by another publisher. The users can request the rights only after authentication by the DRM server. The user rights may include but are not limited to printing, viewing, executing, playing, copying and editing. In addition to these rights, publishers may set few constraints such as time limit or number of views. The permission and constraints can be enforced at granular level, for selected users on selected contents. Revocation of rights is also possible. The DRM users who want to render the digital contents use a DRM client to communicate with the DRM server. The request to access the digital contents from the DRM client is received through the access request receiving module 228. After receiving the access request the DRM server checks whether the DRM user is legitimate user or not based on the user information previously stored in the DRM repository. If the user legitimate then the DRM server authenticates the DRM user through the authentication module 230. The license management module 232 is responsible for generating a DRM license for accessing the digital contents by the authenticated DRM user and sending the license to the authenticated DRM users. The license management module 232 includes symmetric key encryption module 234 and signature generation module 236. The symmetric key encryption module 234 is configured to further encrypt the symmetric key used by the publisher to encrypt the digital contents and signature generation module 236 is configured to digitally sign the license to maintain the integrity of the license during distribution to the DRM user. The DRM license includes the encrypted symmetric key to decrypt the content and the user rights information. The repository 204 includes an active directory 238 which stores all the DRM users' information to authenticate the DRM users and a DRM database 240 to store user certificate, machine certificate, symmetric key to decrypt the content and user rights information.

Figure 3:
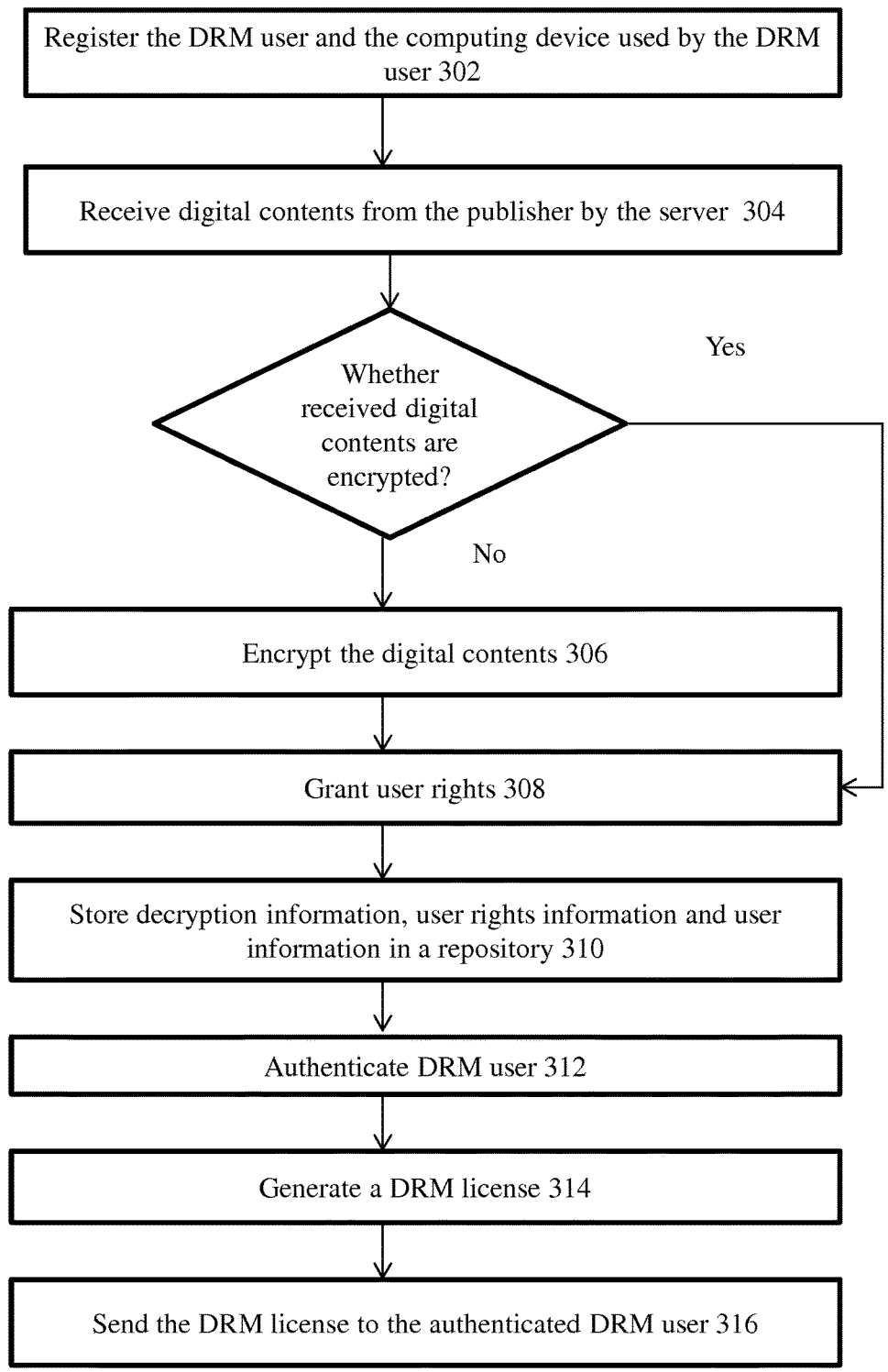
FIG. 3 is a flowchart, illustrating a method for providing access of one or more heterogeneous digital contents to at least one offline Digital Rights Management (DRM) user by a DRM server, in accordance with an embodiment of the present invention.

FIG. 3 is a flowchart, illustrating a method for providing access of one or more heterogeneous digital contents to at least one offline Digital Rights Management (DRM) user by a DRM server. The DRM server registers the DRM users and the users' machine for working offline with the protected digital contents, as in step 302. Before registering with the server, the user needs to authenticate to the server. The server receives the digital contents from the publisher, as in step 304. The digital contents may include but are not limited to texts, images, audio, video, mobile applications, games, software libraries and combination thereof. In case of software libraries, the core functions of the software are implemented by the publisher and a library file is created for it which is called as software library. The publisher then encrypts the digital content by using encryption function and a random symmetric key, as in step 306. As will be better understood further herein, the symmetric key is encrypted by the DRM server. In an alternate embodiment, the publisher may encrypt the content before uploading into the server. After encrypting, the publisher grants one or more rights for the DRM users who want to access the digital contents, as in step 308. One publisher cannot grant rights on the contents published by another publisher. The user rights may include but are not limited to printing, viewing, executing, playing, copying and editing. In addition to these rights, publishers may set few constraints such as time limit or number of views. The permission and constraints can be enforced at granular level, for selected users on selected contents. Revocation of rights is also possible. By changing the rights information on the server the publisher can grant new rights or extend existing privileges to the user. The DRM repository, then, stores all the information regarding decryption of the content, user rights, user specific information, encryption algorithm, as in step 310. The DRM user when wants to access the digital content, it uses a DRM client to communicate with the DRM server. When the DRM client requests for DRM license to access the content the DRM server determines whether the user is legitimate or not and if the user is found legitimate then the DRM server authenticate the user, as in step 312. The legitimacy of the user is determined based on the user specific information stored in the DRM repository. After authenticating the DRM user, the DRM server generates the DRM license, wherein the DRM license includes the information related to decryption of the encrypted content, user rights, encryption algorithm and the server digitally signs the license, as in step 314. Thereafter, the DRM server sends the DRM license to the end users to render the contents, as in step 316. The process of rendering will be explained in more detail below. The software libraries are loaded at the user's machine by using custom class loaders and a library API with reflection for the software application.

Figure 4:
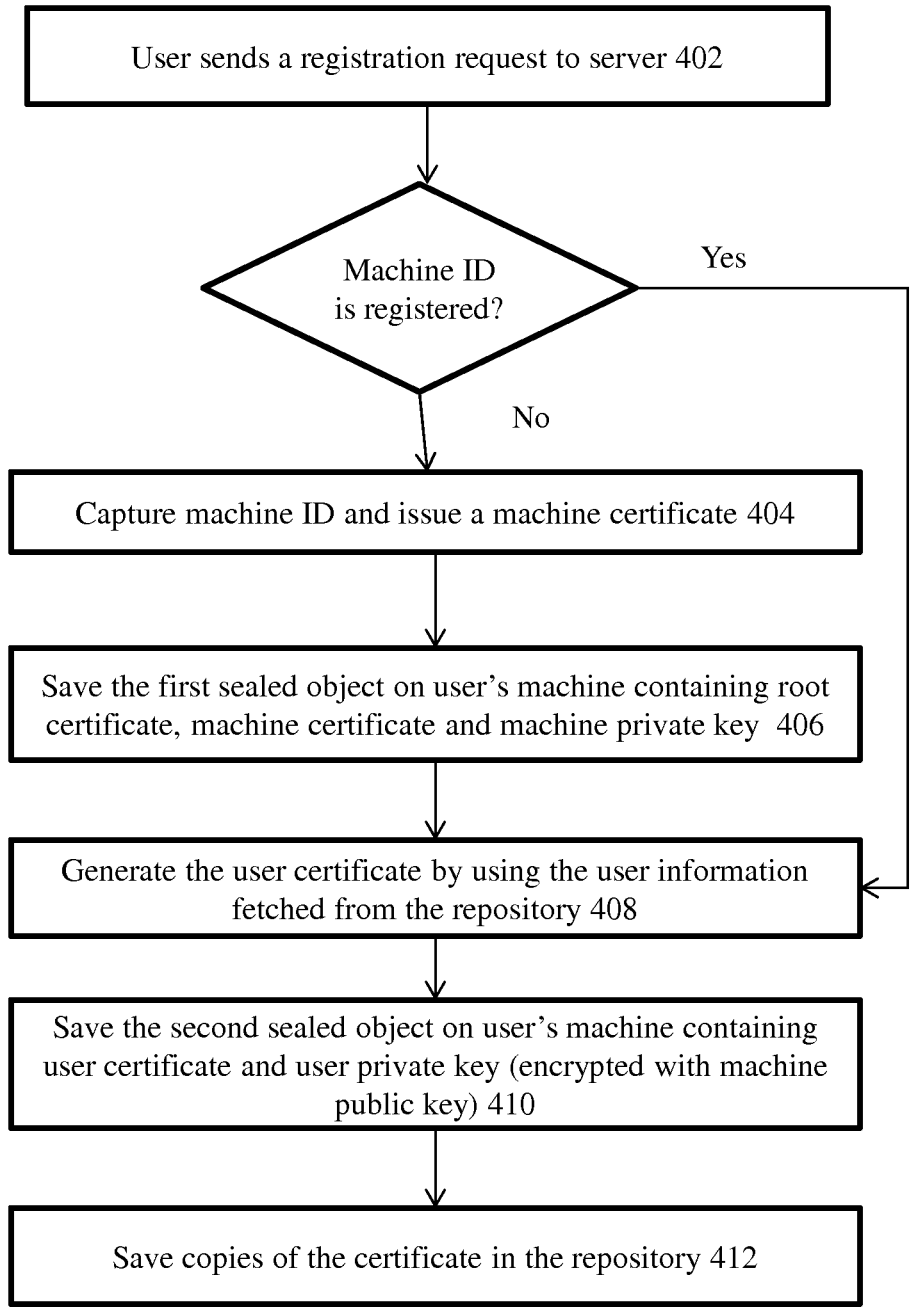
FIG. 4 is a flowchart, illustrating a method of registration in accordance with an embodiment of the present invention.

FIG. 4 is a flowchart, illustrating a method of registration in accordance with an embodiment of the present invention. The DRM user authenticates to the server by login through the user id and user password and requests for registration to work offline, as in step 402. If the machine id is not already registered with the server, then the user requests for the machine certificate by a signed applet or a trusted application such as the DRM client. The DRM server captures the machine ID of the user's machine by the trusted application and generates the machine certificate including machine private key and machine public key, as in step 404. The machine ID is stored as common name extension in machine certificate. The root certificate, machine certificate and machine private key are stored in a first sealed object (e.g. java keystore) which is saved in the user's machine as in step 406. If the user's machine is already registered then the existing machine certificates and keys are used. User now requests for the user certificate and server generates the user certificate, as in step 408. User's details are fetched from the DRM server and stored along with the user public key in user certificate. User private key is encrypted with the machine public key. The root certificate, user certificate and user private key is stored in a second sealed object and saved at the user's machine, as in step 410. The contents in the sealed objects are accessible only to the DRM client. Machine certificate and user certificate are also stored in the DRM repository.

Figure 5:
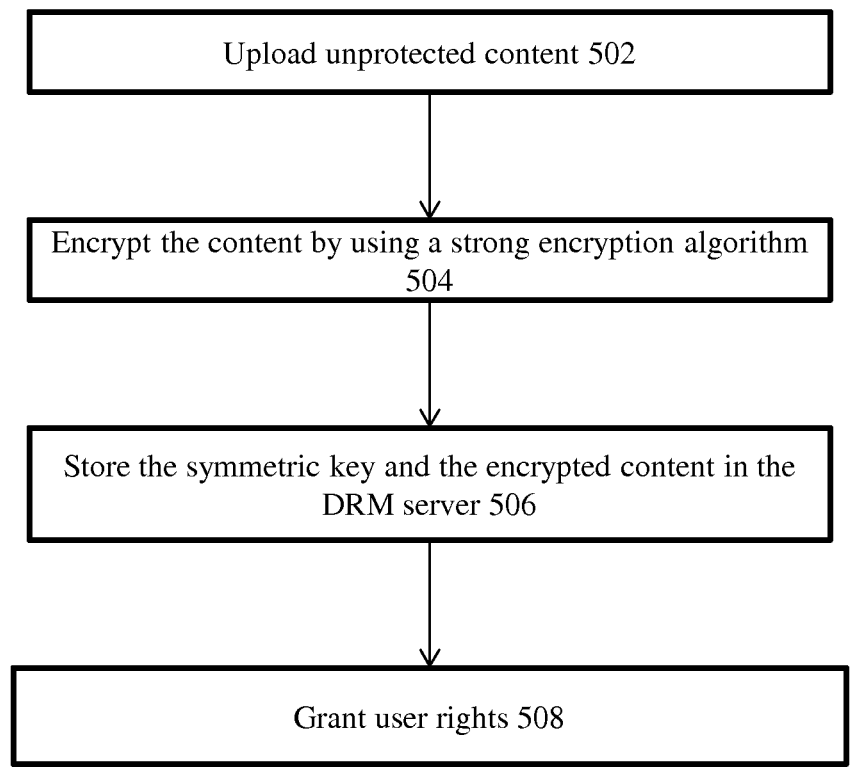
FIG. 5 is a flowchart, illustrating a method of publication in accordance with an embodiment of the present invention.

FIG. 5 is a flowchart, illustrating a method of publication in accordance with an embodiment of the present invention. The publisher uploads the digital contents into the DRM server, as in step 502. Then the publisher encrypts the digital contents by using the encryption function and a random symmetric key to generate the encrypted content, as in step 504. In an alternate embodiment, the publisher can encrypts the content before uploading into the DRM server. The random symmetric key is encrypted with user public key and stored in the DRM database, as in step 506. However, the encrypted files can be stored separately and deleted from the DRM server's database. Then, the user specific rights are granted by the publisher to the users, as in step 508.

Figure 6:
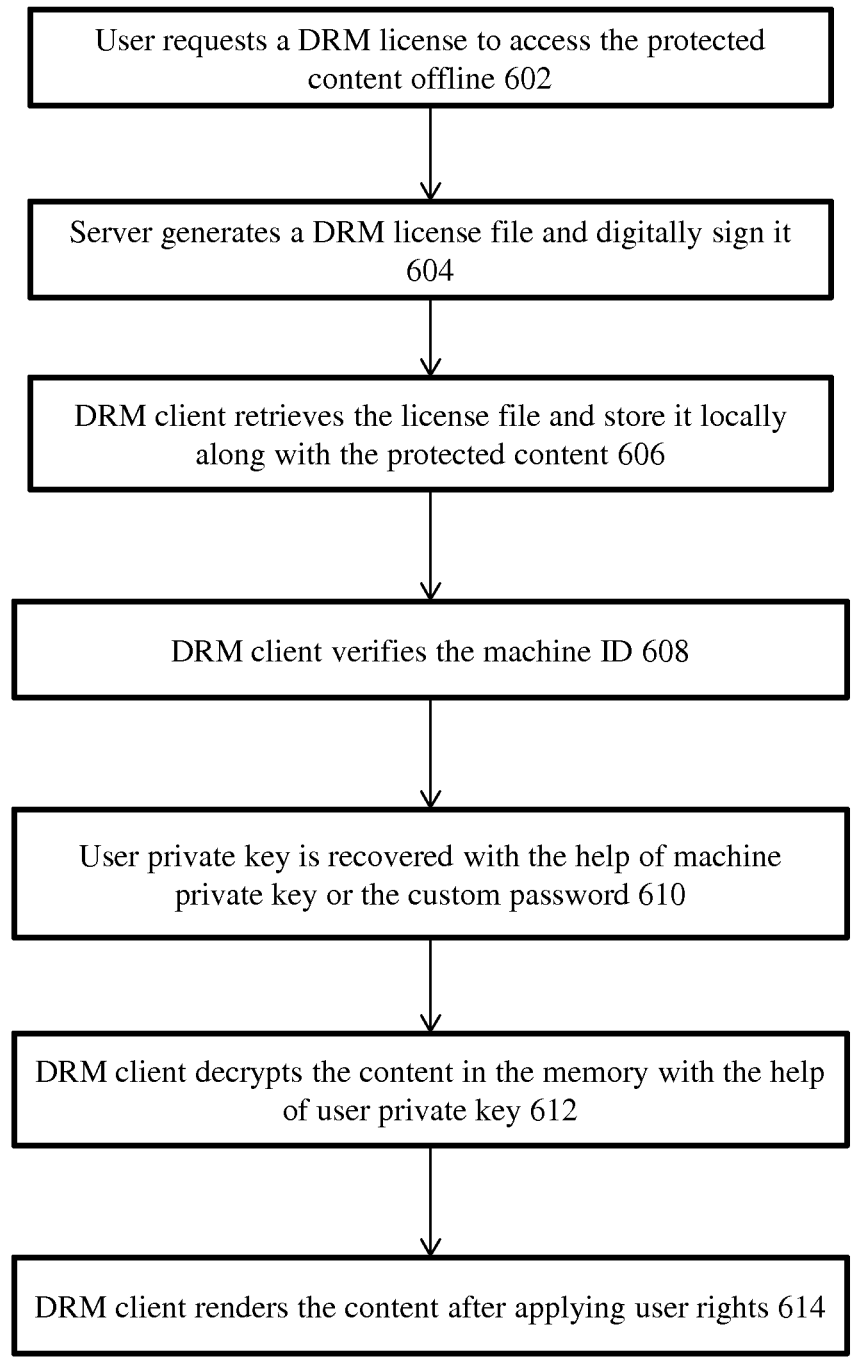
FIG. 6 is a flowchart, illustrating a method of consumption of the digital contents by the DRM user, in accordance with an embodiment of the present invention.

FIG. 6 is a flowchart, illustrating a method of consumption of the digital contents by the DRM user, in accordance with an embodiment of the present invention. To work in offline mode, the user needs to request the DRM license from the DRM server, as in step 602. In an alternative embodiment, the license file can be sent by the publisher through an email. Based on the request from the legitimate user the server generates the required license file to access the encrypted content. The license file contains the random symmetric key encrypted with user public key and the user rights information. The license file is digitally singed by the DRM server using signature function to prevent it from tampering, as in step 604. The DRM client stores the encrypted content and the corresponding license in its local database, as in step 606. When the user tries to access the encrypted content from his local DRM client, the machine ID from the machine certificate is matched with the current machine ID as in step 608. If the machine ID is matched then, the encrypted user private key is recovered with the help of machine private key. The integrity of the license file is also verified. Post verification of the license file, the symmetric key is recovered from the license using user private key in the memory, as in step 610. Then, the DRM client decrypts the encrypted content based in the information stored in the DRM license, as in step 612 and renders the content after applying the user rights, as in step 614.

Figure 7:
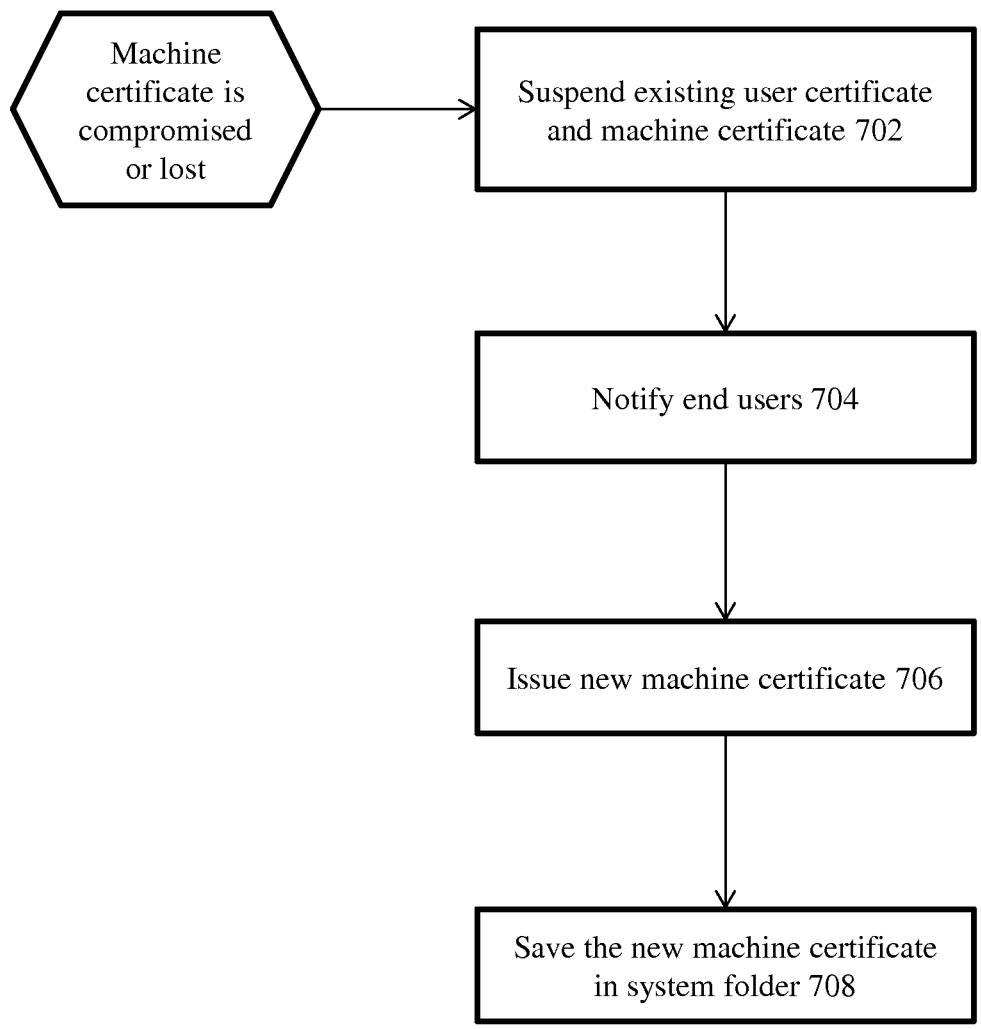
FIG. 7 is a flowchart, illustrating a maintenance activity for machine certificate, in accordance with an embodiment of the present invention.

FIG. 7 is a flowchart, illustrating a maintenance activity for machine certificate, in accordance with an embodiment of the present invention. If the machine certificate is compromised or lost, then the DRM server suspends the existing user certificate and machine certificate, as in step 702 and notify the user about the same, as in step 704. Then, server then generates the new machine certificate, as in step 706. System administrator can request machine registration as machine certificates are to be stored in system folders for extra security, as in step 708. Machine certificate will remain common for all the users on that machine unlike user certificate.

Figure 8:
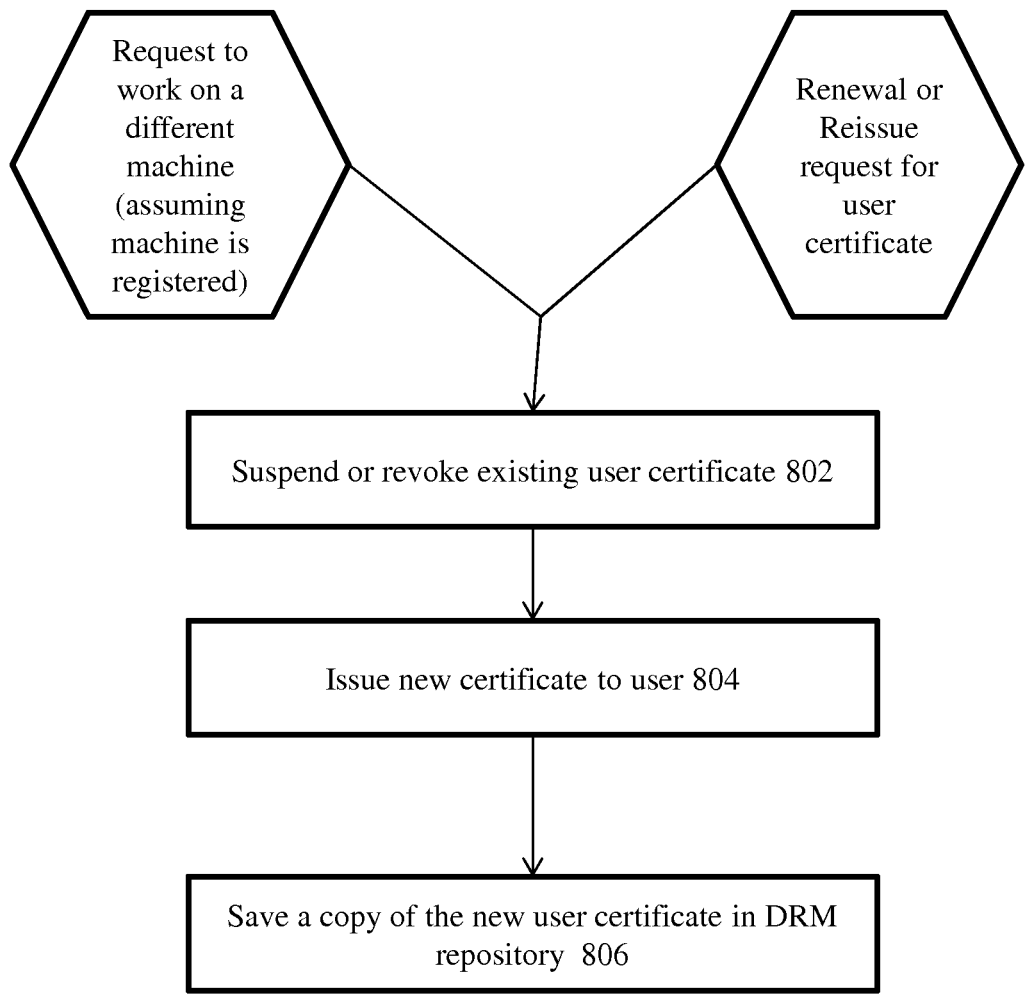
FIG. 8 is a flowchart, illustrating a maintenance activity for user certificate, in accordance with an embodiment of the present invention.

FIG. 8 is a flowchart, illustrating a maintenance activity for user certificate, in accordance with an embodiment of the present invention. If the user wants to work on a different machine which is already registered with the server or if user raises a renewal or reissue request for user certificate, then the server suspends or revokes the existing user certificate, as in step 802. Then it issues new certificate to user, as in step 804 and save a copy of the new user certificate in the DRM repository, as in step 806. Server maintains end user's certificate to generate user license and inform the user about certificate renewal. If the user needs additional rights or extension of the validity period, then he requires a fresh license from the DRM server.

Figure 9:
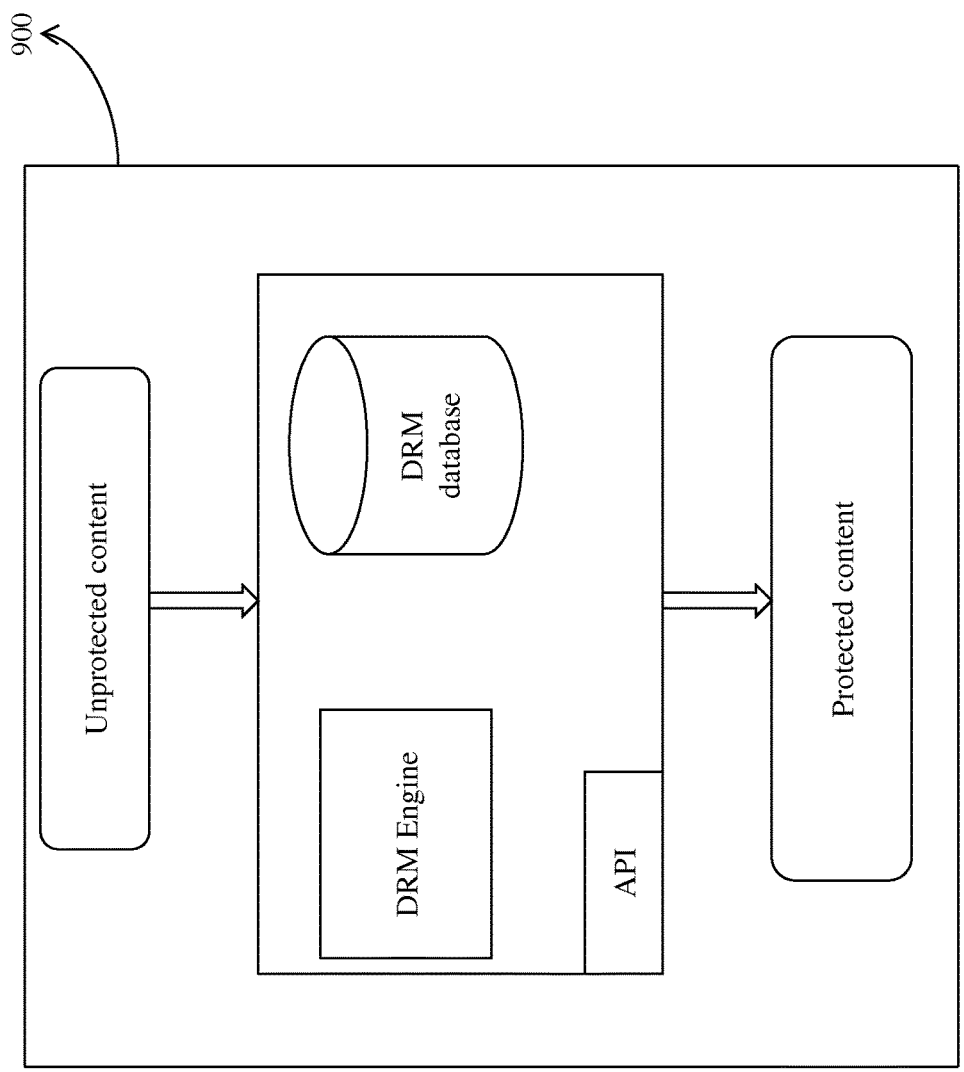
FIG. 9 is a block diagram of the DRM server displaying API for the DRM client integration.

FIG. 9 is a block diagram of the DRM server displaying API for the DRM client integration. The present DRM protection can be applied for any existing or new type of data by utilizing DRM APIs. So, sometime later if a new type of data comes into existence the same DRM protection can be applied for those by creating a DRM client using the DRM APIs which can render the new type of data. The new DRM client can be integrated with the present DRM server using the DRM APIs.

Figure 10:
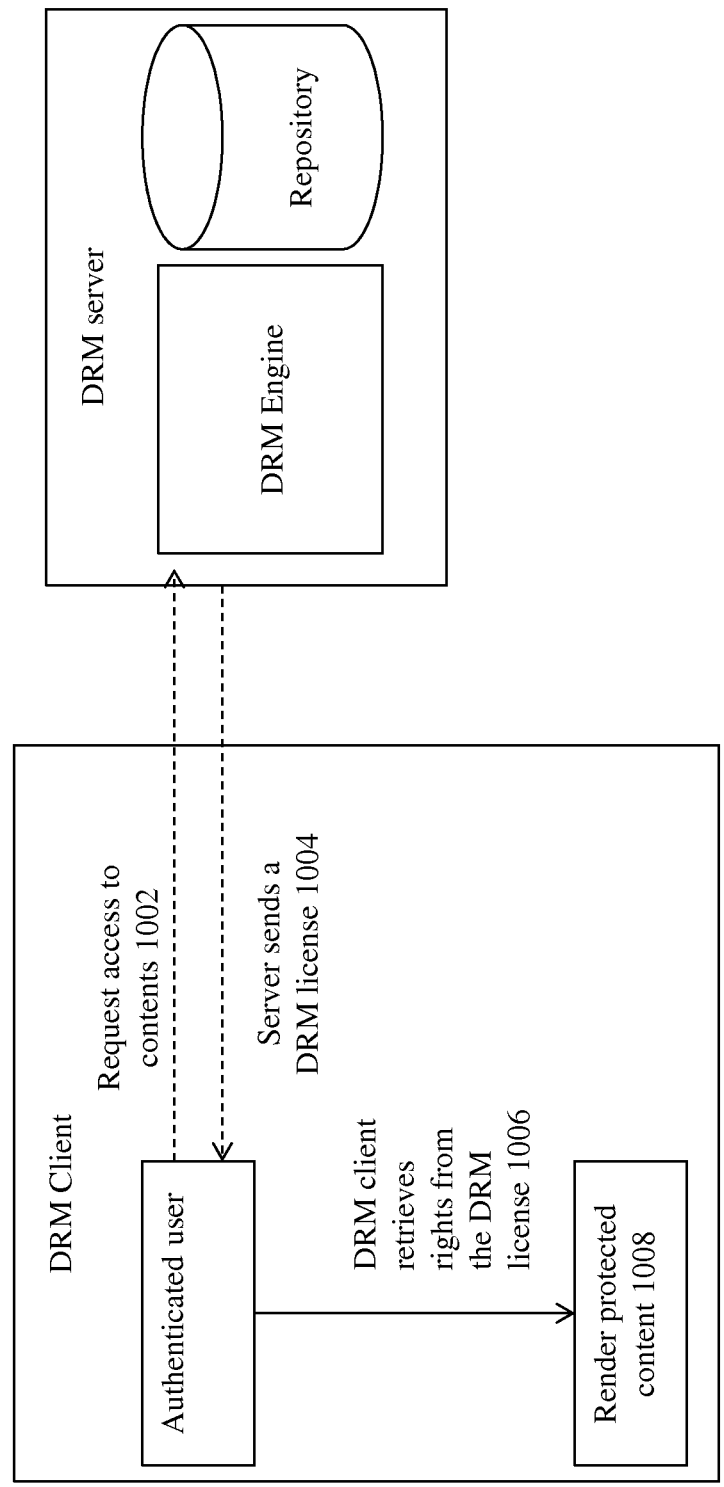
FIG. 10 is a workflow illustrating the integration of the DRM server with the DRM client.

FIG. 10 is a workflow illustrating the integration of the DRM server with the DRM client. An authenticated DRM user sends a secure https request to the DRM server through a DRM client to request access to the encrypted digital contents, as in step 1002. The DRM server sends the DRM license to the authenticated user which includes the user rights information set by the publisher and the decryption information to decrypt the encrypted content, as in step 1004. Then, the DRM client stores the license and the encrypted content locally and when user tries to access the content the DRM client decrypts the encrypted digital contents and retrieves the user rights information from the DRM license, as in step 1006. Based on that, the DRM client render the protected digital content by using a customized software application, as mentioned in step 1008.

Computing Environment

Figure 11:
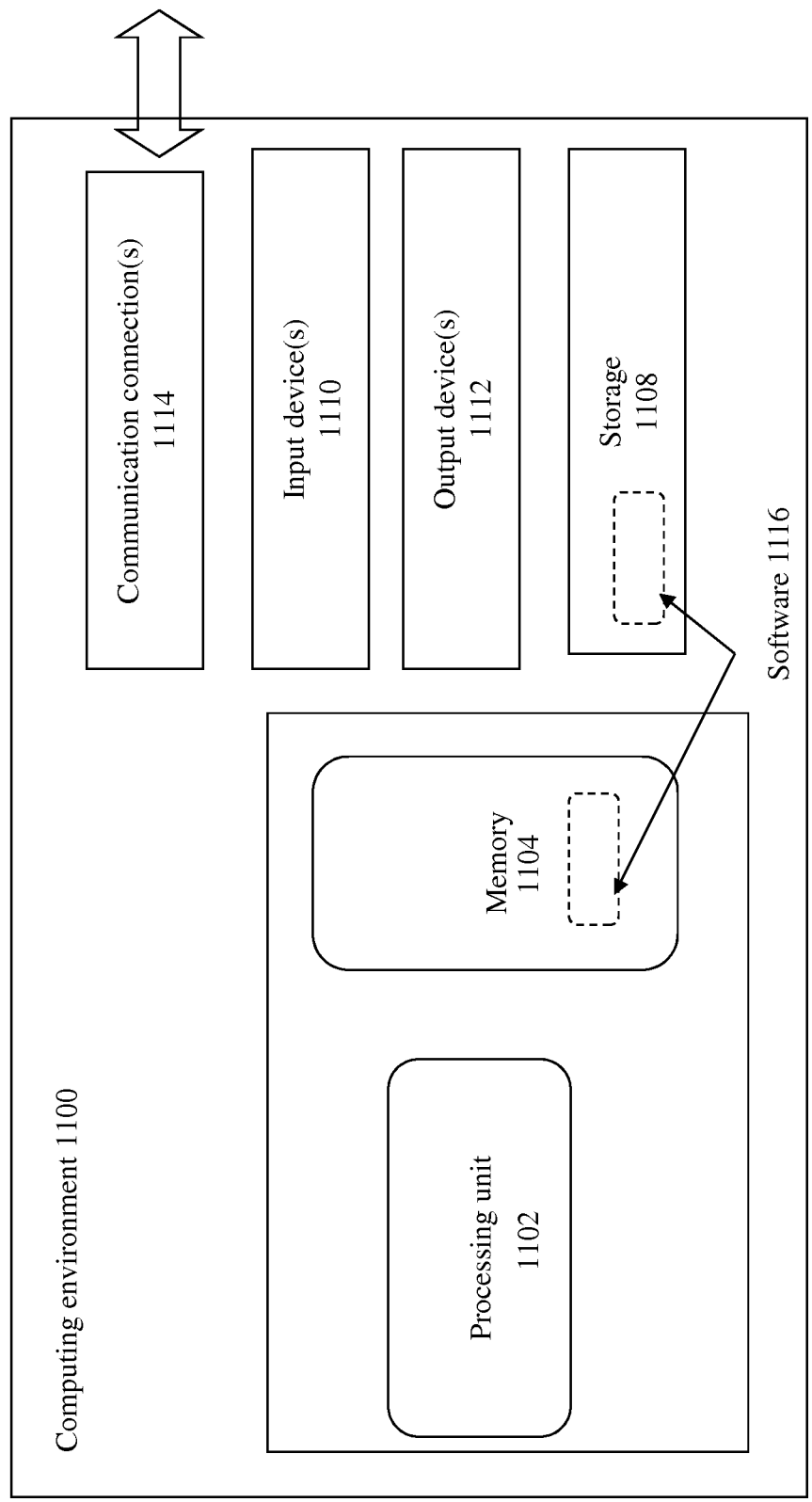
FIG. 11 is a computer architecture diagram illustrating a computing system capable of implementing the embodiments presented herein.

FIG. 11 is a computer architecture diagram illustrating a computing system capable of implementing the embodiments presented herein. The computing environment 1100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like.

With reference to FIG. 11, the computing environment 1100 includes at least one central processing unit 1102 and memory 1104. The central processing unit 702 executes computer-executable instructions. In a multi-processing system, multiple processing units execute computer-executable instructions to increase processing power and as such, multiple processors can be running simultaneously. The memory 1104 may be volatile memory (e.g., registers, cache, RAM), non-volatile memory (e.g., ROM, EEPROM, flash memory, etc.), or some combination of the two. The memory 1104 stores software 1116 that can implement the technologies described herein. A computing environment may have additional features. For example, the computing environment 1100 includes storage 1108, one or more input devices 1110, one or more output devices 1112, and one or more communication connections 1114. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A method, executed by one or more computing devices, for providing offline access of one or more heterogeneous digital contents to at least one Digital Rights Management (DRM) user by a DRM server, the method comprising:
   registering, by one or more of the computing devices, the at least one DRM user by generating a digital user certificate corresponding to the at least one DRM user and a digital machine certificate corresponding to a computing machine of the at least one DRM user by the DRM server, wherein the user certificate and the machine certificate are sent to the at least one DRM user, and the machine certificate comprises a stored machine id of the computing machine of the at least one DRM user;
   receiving, by at least one of the computing devices, the one or more heterogeneous digital contents from a publisher, wherein the one or more heterogeneous digital contents are encrypted by the publisher before or after uploading into the DRM server and grant of one or more rights to the at least one DRM user with respect to the one or more heterogeneous digital contents are received from the publisher;
   storing information related to decryption of the one or more encrypted heterogeneous digital contents, the one or more granted rights, the user certificate, the machine certificate, and information related to the at least one DRM user in a repository, wherein the information related to decryption comprises a random symmetric key;
   authenticating, by at least one of the computing devices, the at least one DRM user requesting the one or more heterogeneous digital contents based on the information related to the at least one DRM user previously stored in the repository;
   generating a DRM license in response to the authentication, wherein the DRM license includes the information for decrypting the one or more encrypted heterogeneous digital contents and the one or more granted rights for the at least one authenticated DRM user, wherein the information for decrypting comprises the random symmetric key encrypted with a user public key of the at least one DRM user; and
   sending, by at least one of the computing devices, the DRM license to the at least one authenticated DRM user for rendering the one or more heterogeneous digital contents, wherein the one or more heterogeneous digital contents are rendered by using the user certificate and the machine certificate stored at the computing machine of the at least one DRM user and the information stored in the DRM license;
   wherein registering further comprises:
   generating, by one of the computing devices, the user certificate for the at least one DRM user and the machine certificate for the computing machine of the at least one DRM user by the DRM server, wherein the user certificate comprises a user private key and the user public key and the machine certificate comprises a machine private key and a machine public key;
   encrypting the user private key with the machine public key;
   storing a root certificate, the machine certificate and the machine private key in a first sealed object at the computing machine of the at least one DRM user, wherein the first sealed object is generated by the computing machine of the at least one DRM user; and
   storing the root certificate, the user certificate and the encrypted user private key in a second sealed object at the computing machine of the at least one DRM user, wherein the second sealed object is generated by the computing machine of the at least one DRM user;
   wherein the digital contents are accessible by performing the following at a current computing machine when a DRM client executing at the current computing machine is offline from the DRM server:
   accessing the DRM license generated at the DRM server and subsequently received by the computing machine of the at least one DRM user from the DRM server;
   verifying integrity of the DRM license based on the first and second sealed objects stored at the computing machine of the at least one DRM user;
   while the DRM client is offline from the DRM server, retrieving the stored machine id of the computing machine of the at least one DRM user from the machine certificate in the first sealed object generated by the DRM client executing at the current computing machine;
   matching a machine identifier of the current computing machine with the retrieved machine id of the computing machine of the at least one DRM user;
   responsive to determining that the machine identifier of the current computing machine matches with the retrieved machine id of the computing machine of the at least one DRM user, recovering the user private key with the machine private key stored in the first sealed object;
   decrypting the encrypted random symmetric key with the user private key; and
   consuming the one or more heterogeneous digital contents by the at least one DRM user based on the one or more granted rights.

2. The method as claimed in claim 1 further comprising:
   when offline, at the computing machine of the at least one DRM user, consuming through a customized software application the one or more heterogeneous digital contents by the at least one DRM user based upon the granted rights by decrypting the one or more heterogeneous digital contents with the information for decrypting stored in the DRM license.

3. The method as claimed in claim 1, wherein the at least one DRM user authenticates to the DRM server before the registering.

4. The method as claimed in claim 1, wherein the machine certificate is generated by capturing a machine ID of the computing machine of the at least one DRM user.

5. The method as claimed in claim 1, wherein the user certificate is generated by capturing one or more user details stored in the DRM server.

6. The method as claimed in claim 1, wherein the one or more heterogeneous digital contents are encrypted by a random symmetric key.

7. The method as claimed in claim 1, wherein the step of generating the DRM license further includes encrypting the random symmetric key in the DRM license by the user public key.

8. The method as claimed in claim 2, wherein the consuming further comprises:
receiving, by at least one of the computing devices, the DRM license generated at the DRM server by at least one DRM client, wherein the DRM license includes the encrypted random symmetric key, the information related to the one or more granted rights and a digital signature of the DRM server;
verifying integrity of the DRM license based on the first and second sealed objects stored at the computing machine of the at least one DRM user;
recovering the user private key with the machine private key stored in the first sealed object;
decrypting the encrypted random symmetric key with the user private key; and
consuming through the customized software application the one or more heterogeneous digital contents by the at least one DRM user based on the one or more granted rights.

9. The method as claimed in claim 8 further comprising:
halting the method and exiting if the integrity of the DRM license is failed and/or if the one or more heterogeneous digital contents are being decrypted on a machine whose machine ID is different from the machine ID stored in the machine certificate.

10. The method as claimed in claim 1, wherein the at least one DRM user uses a DRM client to communicate and authenticate with the DRM server.

11. The method as claimed in claim 10, wherein the DRM client stores the encrypted heterogeneous digital contents and the DRM license in a local database.

12. The method as claimed in claim 1, wherein the DRM server integrates one or more third party DRM clients through an Application Programming Interface (API) call.

13. The method as claimed in claim 1, wherein the one or more heterogeneous digital contents comprises text, image, audio, video, mobile applications, games or software libraries.

14. The method as claimed in claim 13, wherein the software libraries are encrypted and loaded at the computing machine of the at least one DRM user by using one or more custom class loaders and a library API with reflection for a software application.

15. The method as claimed in claim 14, wherein the DRM server controls an execution of the software libraries.

16. The method as claimed in claim 1, wherein the one or more granted rights include one or more constraints or permission for printing, viewing, executing, playing, copying or editing.

17. The method as claimed in claim 1, wherein the publisher can revoke any of the one or more granted rights.

18. The method as claimed in claim 16, wherein the one or more constraints include time limit or number of views.

19. A system for providing offline access of one or more heterogeneous digital contents to at least one Digital Rights Management (DRM) user by a DRM server comprising:
a processor in operable communication with a non-transitory processor readable storage medium, the non-transitory processor readable storage medium containing one or more programming instructions whereby the processor is configured to implement:
a registration module configured to register the at least one DRM user by generating a digital user certificate corresponding to the at least one DRM user and a digital machine certificate corresponding to a computing machine of the at least one DRM user by the DRM server, wherein the machine certificate comprises a stored machine id of the computing machine of the at least one DRM user;
a publication module configured to publish the one or more heterogeneous digital contents in encrypted form at the DRM server, wherein the one or more heterogeneous digital contents are encrypted by a publisher using a random symmetric key before or after uploading into the DRM server;
a user rights management module configured to grant and revoke one or more rights with respect to the one or more heterogeneous digital contents for the at least one DRM user;
a repository configured to store information related to decryption of the encrypted heterogeneous digital contents, the one or more granted rights, the user certificate, the machine certificate, and information related to the at least one DRM user, wherein the information related to decryption comprises the random symmetric key;
an authentication module configured to authenticate the at least one DRM user who requests the one or more heterogeneous digital contents based on information related to the at least one DRM user previously stored in the repository; and
a license management module configured to generate and send a DRM license to the at least one authenticated DRM user to consume the one or more heterogeneous digital contents, wherein the DRM license comprises the random symmetric key encrypted with a user public key of the at least one DRM user;
wherein the registration module further comprises:
a user certificate generation module configured to generate the user certificate for the at least one DRM user, wherein the user certificate comprises a user private key and a user public key;
a machine certificate generation module configured to generate the machine certificate for the computing machine of the at least one DRM user, wherein the machine certificate includes a machine private key and a machine public key; and
a user private key encryption module configured to encrypt the user private key with the machine public key; and
wherein the registration module is further configured to:
store a root certificate, the machine certificate and the machine private key in a first sealed object at the computing machine of the at least one DRM user, wherein the first sealed object is generated by the computing machine of the at least one DRM user; and store the root certificate, the user certificate and the encrypted user private key in a second sealed object at the computing machine of the at least one DRM user, wherein the second sealed object is generated by the computing machine of the at least one DRM user;

wherein the digital contents are accessible by performing the following at a current computing machine when a DRM client executing at the current computing machine is offline from the DRM server:

accessing the DRM license generated at the DRM server and subsequently received by the computing machine of the at least one DRM user from the DRM server;

verifying integrity of the DRM license based on the first and second sealed objects stored at the computing machine of the at least one DRM user;

while the DRM client is offline from the DRM server, retrieving the stored machine id of the computing machine of the at least one DRM user from the machine certificate in the first sealed object;

matching a machine identifier of the current computing machine with the retrieved machine id of the computing machine of the at least one DRM user;

responsive to determining that the machine identifier of the current computing machine matches with the retrieved machine id of the computing machine of the at least one DRM user, recovering the user private key with the machine private key stored in the first sealed object;

decrypting the encrypted random symmetric key with the user private key; and consuming the one or more heterogeneous digital contents by the at least one DRM user based on the one or more granted rights.

20. The system as claimed in claim 19, wherein the machine certificate is generated by capturing a machine ID of the computing machine of the at least one DRM user.

21. The system as claimed in claim 19, wherein the user certificate is generated by capturing one or more user details stored in the DRM server.

22. The system as claimed in claim 19, wherein the license management module further comprises:
a symmetric key encryption module configured to encrypt the random symmetric key by the user public key; and
a signature generation module configured to digitally sign the DRM license.

23. The system as claimed in claim 19, wherein the at least one DRM user uses a DRM client to communicate with the DRM server.

24. The system as claimed in claim 23, wherein the DRM client stores the encrypted heterogeneous digital contents and the DRM license in a local database.

25. The system as claimed in claim 19, wherein the DRM server integrates one or more third party DRM clients through an Application Programming Interface (API) call.

26. The system as claimed in claim 19, wherein the one or more heterogeneous digital contents comprises text, image, audio, video, mobile applications, games and software libraries.

27. The system as claimed in claim 26, wherein the software libraries are encrypted and loaded at the computing machine of the at least one DRM user by using one or more custom class loaders and a library API with reflection for a software application.

28. The system as claimed in claim 27, wherein the DRM server controls an execution of the software libraries.

29. The system as claimed in claim 19, wherein the one or more granted rights include one or more constraints or permission for printing, viewing, executing, playing, copying or editing.

30. The system as claimed in claim 19, wherein the DRM license includes a decryption key to decrypt the encrypted heterogeneous digital contents and information related to the one or more granted rights.

31. A non-transitory storage storing computer-executable instructions that when executed by a computer system perform a method of providing offline access of one or more heterogeneous digital contents to at least one Digital Rights Management (DRM) user by a DRM server, the method comprising:

registering the at least one DRM user by generating a digital user certificate corresponding to the at least one DRM user and a digital machine certificate corresponding to a computing machine of the at least one DRM user by the DRM server, wherein the user certificate and the machine certificate are sent to the at least one DRM user, and the machine certificate comprises a stored machine id of the computing machine of the at least one DRM user;

receiving the one or more heterogeneous digital contents from a publisher, wherein the one or more heterogeneous digital contents are encrypted by the publisher before or after uploading into the DRM server and grant of one or more rights to the at least one DRM user with respect to the one or more heterogeneous digital contents are received from the publisher;

storing information related to decryption of the one or more encrypted heterogeneous digital contents, the one or more granted rights, the user certificate, the machine certificate, and information related to the at least one DRM user in a repository, wherein the information related to decryption comprises a random symmetric key;

authenticating the at least one DRM user requesting the one or more heterogeneous digital contents based on the information related to the at least one DRM user previously stored in the repository;

generating a DRM license in response to the authentication, wherein the DRM license includes the information for decrypting the one or more encrypted heterogeneous digital contents and the one or more granted rights for the at least one authenticated DRM user, wherein the information for decrypting comprises the random symmetric key encrypted with a user public key of the at least one DRM user; and sending the DRM license to the at least one authenticated DRM user for rendering the one or more heterogeneous digital contents, wherein the one or more heterogeneous digital contents are rendered by using the user certificate and the machine certificate stored at the computing machine of the at least one DRM user and the information stored in the DRM license;

wherein the user certificate comprises a user private key and the user public key and the machine certificate comprises a machine private key and a machine public key;

and the registering further comprises:

encrypting the user private key with the machine public key;

storing a root certificate, the machine certificate and the machine private key in a first sealed object at the computing machine of the at least one DRM user, wherein the first sealed object is generated by the computing machine of the at least one DRM user;

storing the root certificate, the user certificate and the encrypted user private key in a second sealed object at the computing machine of the at least one DRM user wherein the second sealed object is generated by the computing machine of the at least one DRM user; and when a DRM client executing at a current computing machine is offline from the DRM server, consuming through a customized software application the one or more heterogeneous digital contents by the at least one DRM user based upon the granted rights by decrypting the one or more heterogeneous digital contents with the information for decrypting stored in the DRM license; and wherein the consuming further comprises, while the DRM client is offline from the DRM server:

accessing the DRM license generated at the DRM server and subsequently received by the DRM client from the DRM server, wherein the DRM license includes the encrypted random symmetric key, the information related to the one or more granted rights and a digital signature of the DRM server;

verifying integrity of the DRM license based on the first and second sealed objects stored at the computing machine of the at least one DRM user;

while the DRM client is offline from the DRM server, retrieving the stored machine id of the computing machine of the at least one DRM user from the machine certificate in the first sealed object generated by the DRM client executing at the current computing machine;

matching a machine identifier of the current computing machine with the retrieved machine id of the computing machine of the at least one DRM user;

responsive to determining that the machine identifier of the current computing machine matches with the retrieved machine id of the computing machine of the at least one DRM user, recovering the user private key with the machine private key stored in the first sealed object;

decrypting the encrypted random symmetric key with the user private key; and consuming through the customized software application the one or more heterogeneous digital contents by the at least one DRM user based on the one or more granted rights.

32. The non-transitory storage of claim 31, wherein the method further comprises:

storing the stored machine id of the computing machine of the at least one DRM user as a common name extension in the machine certificate in the first sealed object.

33. The non-transitory storage of claim 31 wherein:

the first sealed object comprises a Java keystore.

* * * * *